(12) United States Patent
Eldon et al.

(10) Patent No.: US 7,978,263 B2
(45) Date of Patent: Jul. 12, 2011

(54) MOBILE PHONE CONFIGURATION

(75) Inventors: James Eldon, Fleet (GB); Ricky Barnet, St. Albans (GB); Anthony Dalby, London (GB); Brian Davidson, Woking (GB)

(73) Assignee: Nokia Corporation, Espoo (FI)

( * ) Notice: Subject to any disclaimer, the term of this patent is extended or adjusted under 35 U.S.C. 154(b) by 497 days.

(21) Appl. No.: 10/584,496

(22) PCT Filed: Jun. 30, 2004

(86) PCT No.: PCT/IB2004/002181
§ 371 (c)(1),
(2), (4) Date: Apr. 17, 2007

(87) PCT Pub. No.: WO2005/064898
PCT Pub. Date: Jul. 14, 2005

(65) Prior Publication Data
US 2007/0238441 A1    Oct. 11, 2007

(30) Foreign Application Priority Data
Dec. 23, 2003  (GB) ................... 0329858.5

(51) Int. Cl.
H04N 5/225    (2006.01)
(52) U.S. Cl. .................. 348/373; 455/347; 455/349
(58) Field of Classification Search ........... 348/373; 455/347, 349
See application file for complete search history.

(56) References Cited

U.S. PATENT DOCUMENTS

| | | | |
|---|---|---|---|
| 5,363,089 A * | 11/1994 | Goldenberg | ............... 340/7.63 |
| 6,445,577 B1 | 9/2002 | Madsen et al. | |
| 6,549,789 B1 | 4/2003 | Kfoury | |
| 6,650,547 B2 | 11/2003 | Hemmi et al. | |
| 6,999,802 B2 * | 2/2006 | Kim | ............... 455/575.1 |
| 7,123,304 B2 * | 10/2006 | Lu et al. | ............... 348/333.06 |
| 2002/0025827 A1 * | 2/2002 | Song | ............... 455/550 |
| 2002/0044425 A1 | 4/2002 | Ijas et al. | |
| 2003/0036365 A1 | 2/2003 | Kuroda | |
| 2003/0210440 A1 * | 11/2003 | Hiroyasu et al. | ............... 358/523 |
| 2003/0228847 A1 | 12/2003 | Matsumoto | |

FOREIGN PATENT DOCUMENTS

| | | |
|---|---|---|
| EP | 1 335 567 A1 | 8/2003 |
| JP | 10-75287 A | 3/1998 |
| WO | WO 03/075475 * | 3/2003 |

OTHER PUBLICATIONS

Chinese Office Action issued May 16, 2008 in CN PCT National Phase application No. 200480037845.2; 8 pgs.
Chinese Office Action issued Oct. 31, 2008 in CN PCT National Phase application No. 200480037845.2; 10 pgs.

* cited by examiner

*Primary Examiner* — Sinh Tran
*Assistant Examiner* — Anthony J Daniels
(74) *Attorney, Agent, or Firm* — Banner & Witcoff, Ltd.

(57) ABSTRACT

A handheld electronic device hinge for mechanically connecting first and second rotatable body members of a handheld electronic device, said hinge comprising a first bracket and a second bracket, wherein said first bracket comprises: a first connecting member for connecting to the first rotatable body member of the handheld electronic device for rotation around a first axis; and a second connecting member connected to the second bracket for rotation of said second bracket around a second axis, said first and second axes being parallel to each other, and wherein said second bracket comprises a third connecting member for connecting to the second rotatable body member of the handheld electronic device for rotation around a third axis, said third axis being perpendicular to said first and second axes.

24 Claims, 18 Drawing Sheets

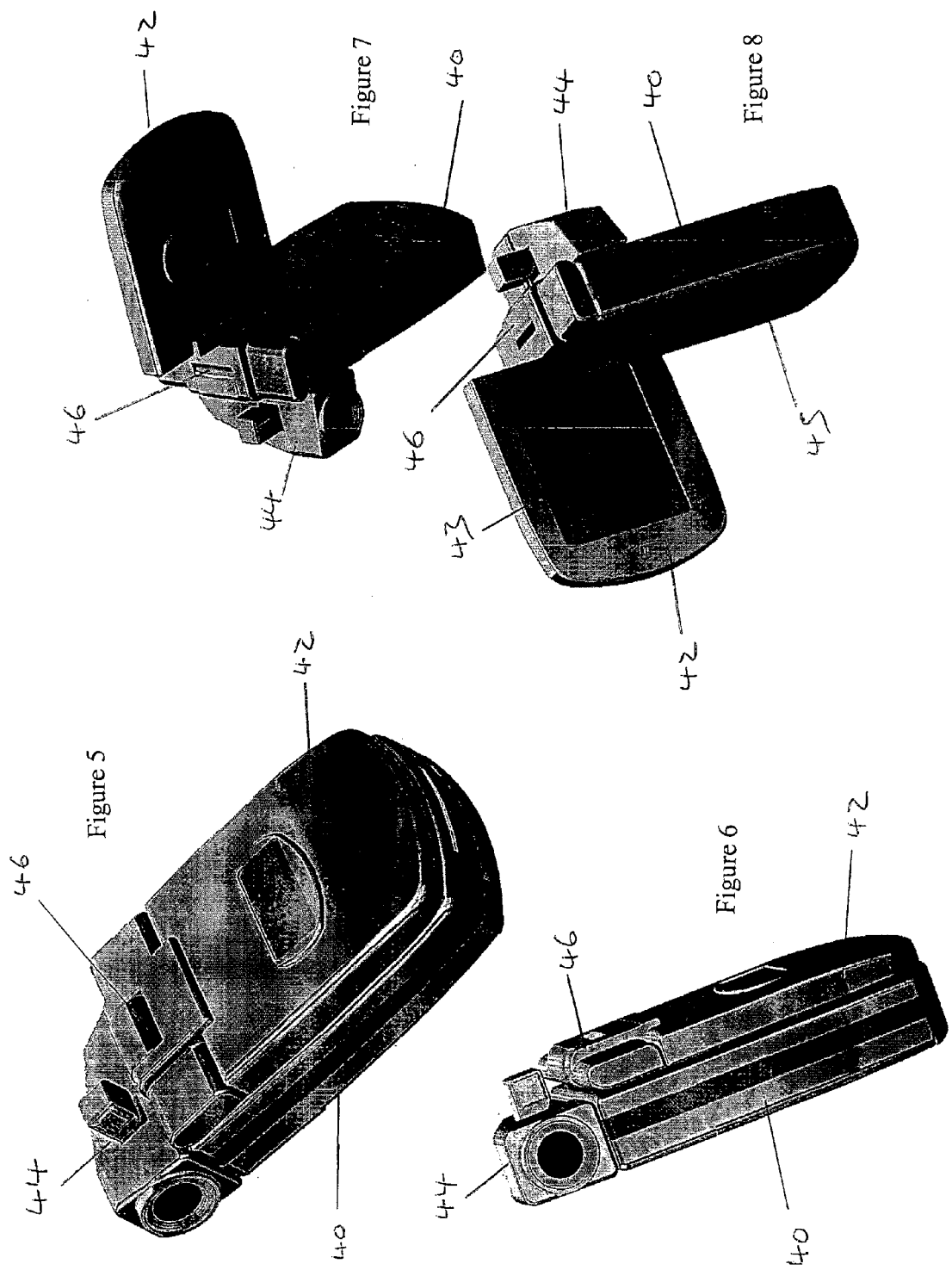

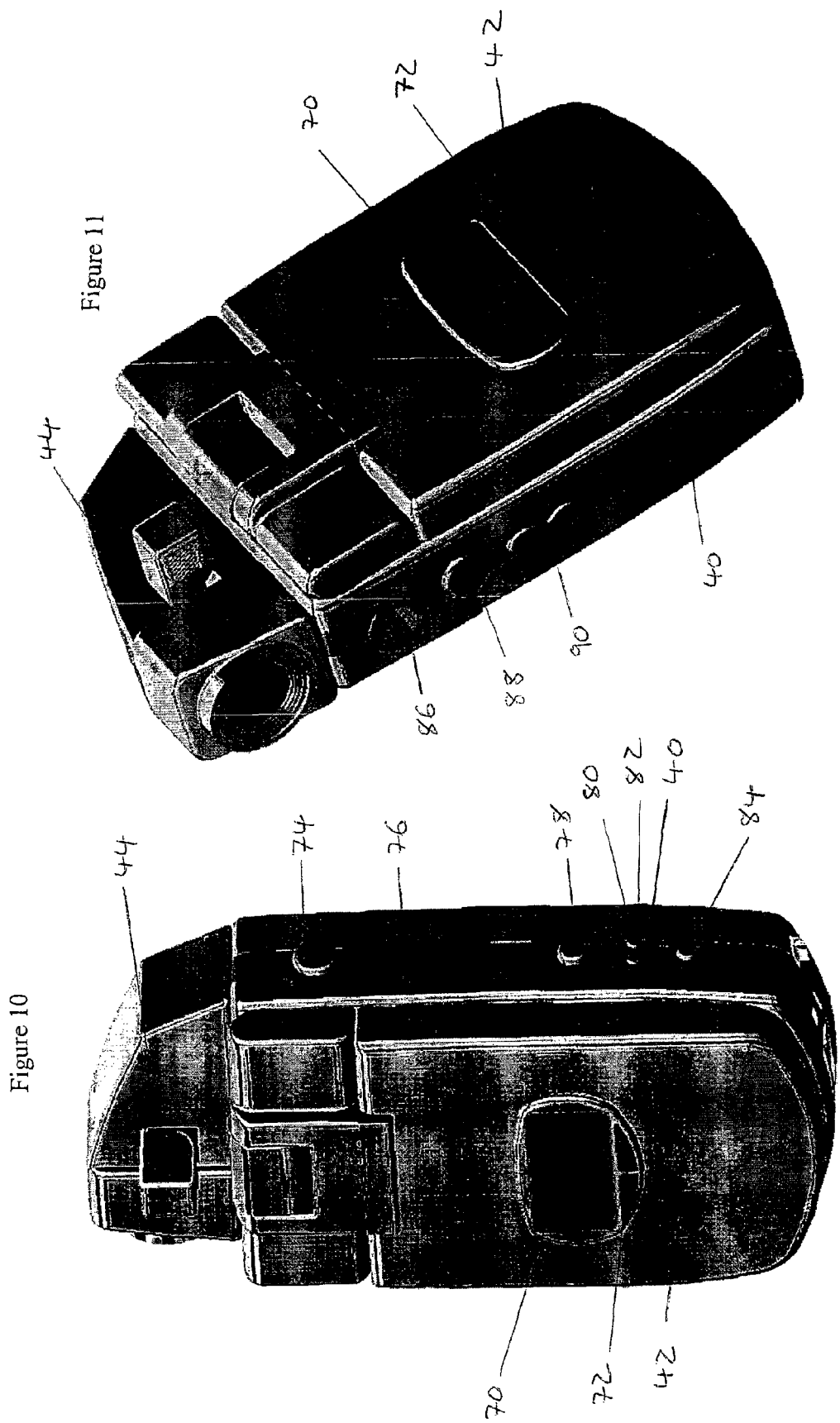

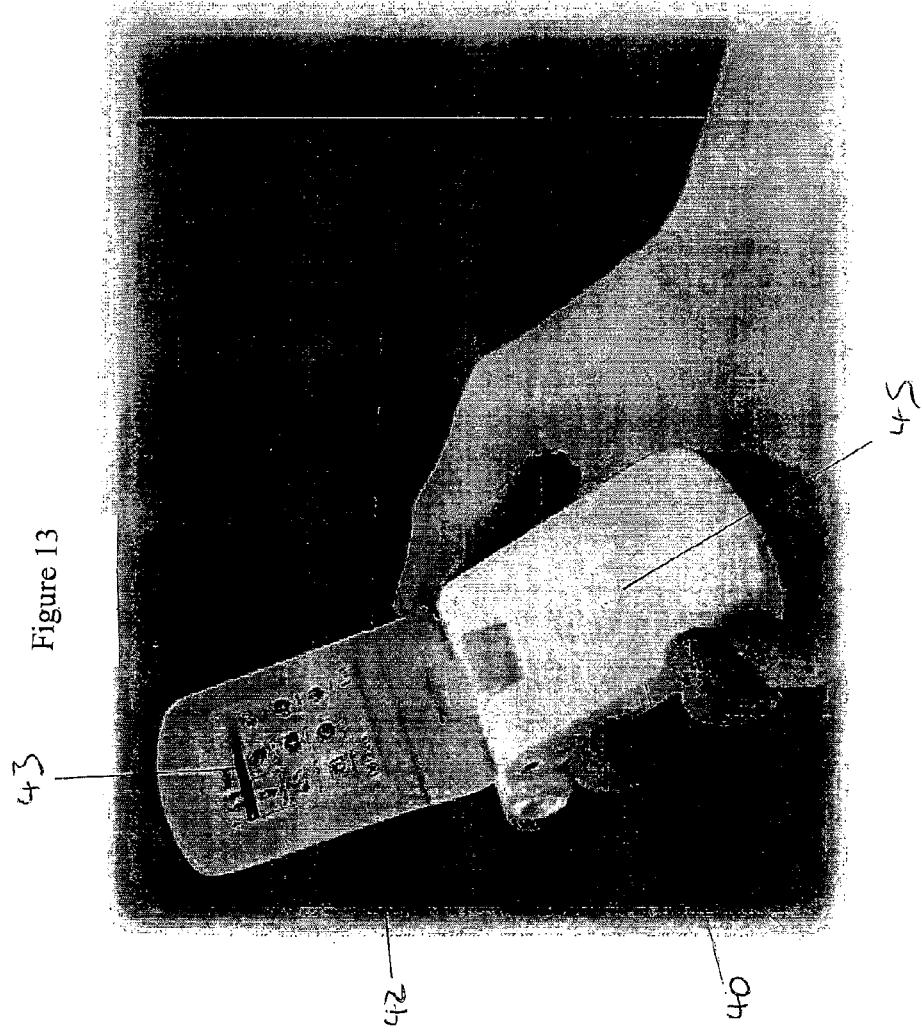

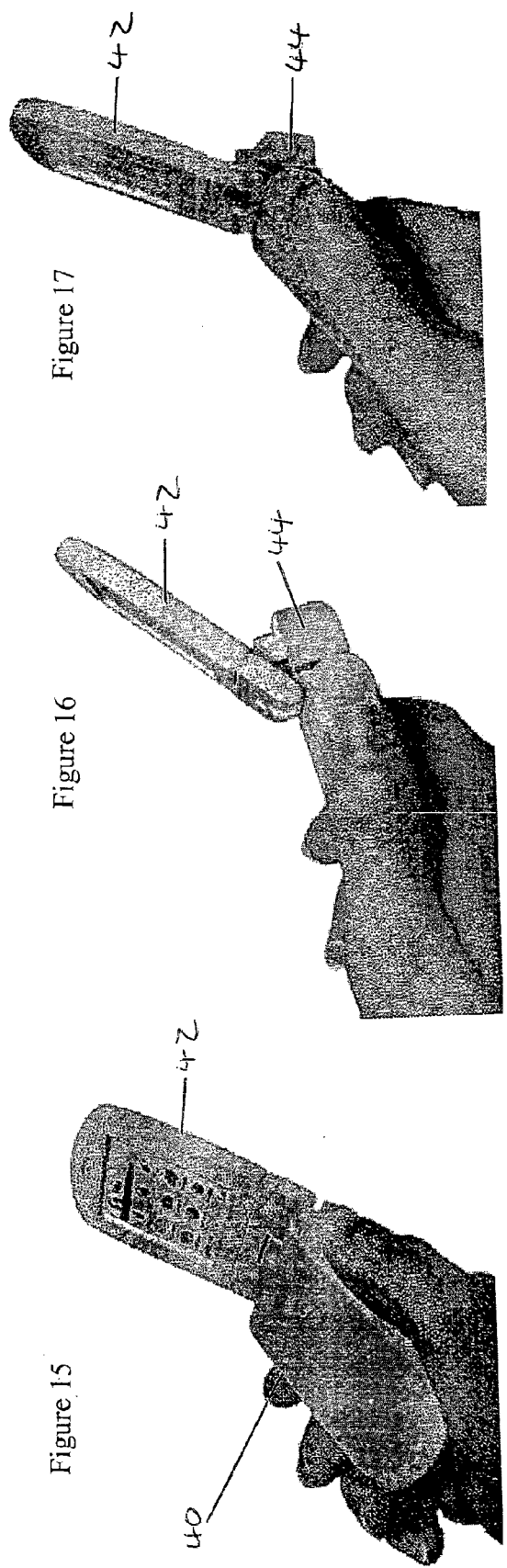

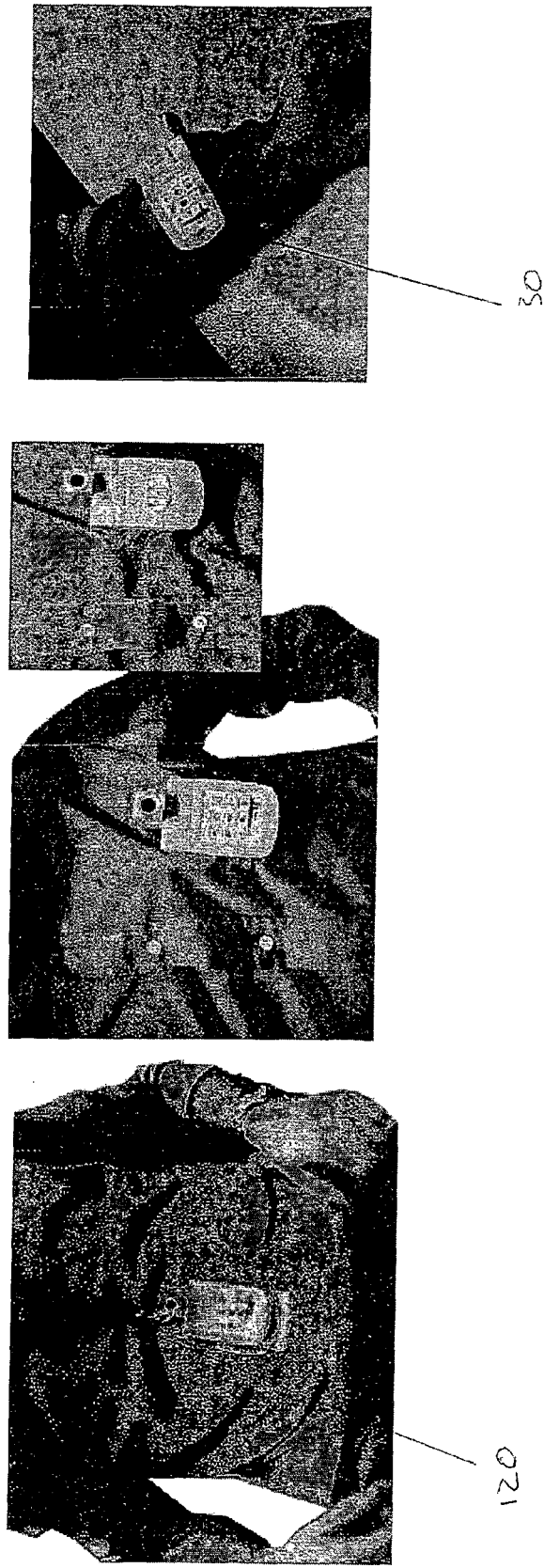

MOBILE PHONE CONFIGURATION

This application is a National Stage application of co-pending PCT application PCT/IB2004/002181 filed Jun. 30, 2004, which was published in English under PCT Article 21(2) on Jul. 14, 2005, and which claims the benefit of Great Britain patent application Serial No. 0329858.5 filed Dec. 23, 2003. These applications are incorporated herein by reference in there entireties.

FIELD OF INVENTION

The present invention relates to a handheld electronic device having a large number of physical configurations suitable for different uses. Particularly, but not exclusively, the present invention relates to a mobile phone including video and/or camera functionality.

BACKGROUND OF INVENTION

A problem with known handheld electronic devices is providing a device which is small enough to be carried about by a user, while being large enough to incorporate essential features of the device for operation.

Another problem with some known handheld electronic devices is that they have become so small that they are difficult to hold, manipulate and operate. In particular, they are both difficult to hold and operate at the same time.

Another problem with known handheld electronic devices is that of operating buttons on the device while carrying the device around.

The device may also be damaged while being carried around, for example the screen of the device may be scratched or broken.

A further problem more specific to mobile phone devices is that they have become so small that in use they no longer cover the mouth of a user at the same time as the ear. That is, the mouth coverage is poor due to the smaller size of modern devices. This can lead to poor sound quality for both caller and recipient. Furthermore, there is a reduction in the degree of privacy in that a user's mouth is not covered by the phone while talking. Small handsets may also provide an uncomfortable grip. With small phones the user has to hold his/her arm higher in order to hold the phone to his/her ear which can be strenuous and uncomfortable.

In contrast, when using other functions of the phone such as text messaging, internet facilities or the like, there is no such need for a user to hold the phone to his/her ear.

Known mechanical solutions to some of the above-described problems include the implementation of a slide design, a rotational design or a flip/clamshell/fold design. These solutions allow for the handheld electronic device to be carried around in a configuration which is small in size when not in use. Furthermore, buttons/keys on the device may be covered by at least a portion of the casing when in this configuration so as to prevent accidental operation. The handheld electronic device may then be reconfigured into an operational configuration which is generally larger in size and better shaped to allow a user to both hold and operate the device.

The above-identified solutions comprise a body of at least two parts and a hinge (or other similar mechanical mechanism) therebetween whereby in use the device can be moved from a compact configuration to an expanded configuration. In the compact configuration the device is small and compact so as to be easy to carry. In the expanded configuration, the device is arranged so as to be easy to hold and operate at the same time.

Known arrangements in the field of mobile phones include foldable clam structure, a slidable structure and more recently a rotatable two-part structure. Each of these known solutions is limited in the number of stable configurations that the two parts of the device can take. In fact, the aforementioned solutions effectively only have two configurations, a closed configuration and an open configuration.

More recently still multi-axis hinges have been proposed. U.S. Pat. No. 6,549,789 discloses a handheld electronic device comprising a housing including a first housing portion and a second housing portion, the two housing portions being coupled by a swivel hinge that allows the two housing portions to rotate about a first axis such as the housing fold together axis, and a second axis perpendicular to the first axis, allowing the housings to rotate relative to one another.

Another problem with non-handheld electronic devices is that of incorporating multiple elements having different functionality into a single device. One example of such an integrated device is a mobile phone having camera/video capability.

Previous solutions to incorporating a camera/video into a mobile phone include single bodied block phones comprising a camera/video. In some arrangements, the camera/video is an integral part of the phone. In other arrangements, the camera/video is provided as a separate add-on which can be attached to the body of the phone for providing camera/video functionality.

Camera/video functionality has also been provided in mobile phones having two housing portions such as the clam shell configuration. Again, the video/camera may be incorporated into the body of the mobile phone or provided as a separate add on feature.

In the above-identified arrangements, the camera/video is fixed relative to the housing of the phone. Accordingly, in order to use the camera/video functionality, the whole of the mobile phone housing must be oriented in such a direction as to capture the intended image. This can pose functional difficulties in that it may be difficult to observe the screen while pointing the camera/video. Furthermore, it may be difficult to operate buttons on the device while pointing the camera/video. Furthermore, when taking a picture, it is generally advisable to keep any bright light sources behind the viewer of the camera/video. In doing so, it may be difficult to observe the screen which will be pointing at the strong light source in such an arrangement.

In prior art arrangements, it may also be difficult to stand the phone on a desk or table while using the camera/video functionality. This kind of functionality may be useful for videoconferences and the like. This kind of functionality will also be useful for taking self-portraits using a timer facility on the camera.

The user of such a camera may also want to take a picture without surrounding people knowing that a picture has been taken. Standard devices require that the body of the camera be pointed at the intended object for image capture. Thus, it is difficult to take a picture without it being obvious to surrounding people that a picture is being taken.

SUMMARY OF THE INVENTION

An aim of the embodiments described hereinafter is to solve the problems outlined above.

According to the present invention there is provided a handheld electronic device hinge for mechanically connecting first and second rotatable body members of a handheld electronic device, said hinge comprising a first bracket and a second bracket, wherein said first bracket comprises: a first connecting member for connecting to the first rotatable body member of the handheld electronic device for rotation around a first axis; and a second connecting member connected to the second bracket for rotation of said second bracket around a second axis, said first and second axes being parallel to each other, and wherein said second bracket comprises a third connecting member for connecting to the second rotatable body member of the handheld electronic device for rotation around a third axis, said third axis being perpendicular to said first and second axes.

According to another aspect of the present invention there is provided a handheld electronic device comprising a first rotatable body member, a second rotatable body member and a handheld electronic device hinge as described herein, said handheld electronic device hinge connecting said first rotatable body member and said second rotatable body member.

According to another aspect of the present invention there is provided a handheld electronic device comprising a first rotatable body member, a second rotatable body member, a third rotatable body member and a handheld electronic device hinge, said handheld electronic device hinge being disposed between said first, second and third rotatable body members whereby said first, second and third rotatable body members are rotatable relative to each other.

Embodiments of the present invention have solved the above-identified problems by providing a handheld electronic device comprising two portions with a hinge mechanism therebetween. The hinge mechanism functions such that the two portions can be articulated into a plurality of different relative configurations.

Another major benefit of embodiments of the present invention is that a path is provided inside the hinge mechanism to accommodate electrical connections between the two main body parts which is difficult to achieve using traditional camcorder display type hinges.

One embodiment of the present invention solves the above-identified problems by providing a mobile phone comprising a camera/video. The camera comprises two portions with a hinge mechanism therebetween. The hinge mechanism functions such that the two portions can be articulated into a plurality of different relative configurations. The camera/video is mounted on the hinge mechanism such that the camera/video can be articulated into a plurality of different configurations relative to each of the two portions of the mobile phone.

BRIEF DESCRIPTION OF THE DRAWINGS

For a better understanding of the present invention and to show how the same may be carried into effect, reference will now be made by way of example, to the accompanying drawings, in which:

FIG. 5 shows a videophone according to the present invention in a closed configuration;

FIG. 6 shows another view of the videophone of FIG. 5 in a closed configuration;

FIG. 7 shows the videophone of FIGS. 5 and 6 in a first open position;

FIG. 8 shows the arrangement of FIG. 7 from a different direction;

FIG. 9 also shows the relationship between the elements of the hinge module and the parts of the videophone to which they are connected;

FIG. 10 shows the position of buttons along a side of the videophone;

FIG. 11 shows an alternative view of the videophone;

FIG. 13 shows the model of FIG. 12 in a first open configuration;

FIG. 14 shows the model of FIGS. 12 and 13 with the user operating keys on the keypad;

FIG. 15 shows the model of FIGS. 12 to 14 with the camera module fully rotated;

FIG. 16 shows the model of FIGS. 12 to 15 with the camera module in line with the phone body;

FIG. 17 shows the model of FIGS. 12 to 16 with the camera module at an angle in between the fully rotated and in-line configurations of FIGS. 15 and 16 respectively;

FIG. 35 shows the model attached by a necklace/lanyard around a user's neck;

FIG. 36 shows the model arranged to be attached to a pocket of a user's clothing;

FIG. 37 shows the model attached by a wrist/armband to a user's wrist.

DETAILED DESCRIPTION OF THE EMBODIMENTS OF THE INVENTION

The terminology used for the different mechanism movements and positions will be described with reference to FIGS. 1 to 3.

Figure 1:
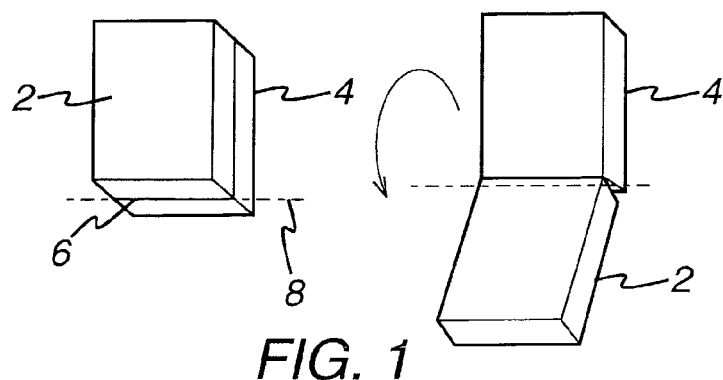
FIG. 1 is a schematic diagram illustrating a flip action of a device.

FIG. 1 shows the flip action of a product. The product comprises two portions (2,4) with a hinge mechanism (6) therebetween. In a first or folded configuration, the two portions (2,4) are opposed to each other. One portion of the product unfolds relative to the other portion (4) via the hinge (6) into a second or open configuration, the two portions (2,4) being disposed at an angle of 180° relative to each other or at an angle between 0 and 180° (for example in an arrangement adapted to fit the contour of a user's face). The rotational axis (8) lies within the plane of the moving part (2) and extends in a line between the two parts (2,4). An example of this action is the opening of a laptop computer.

Figure 2:
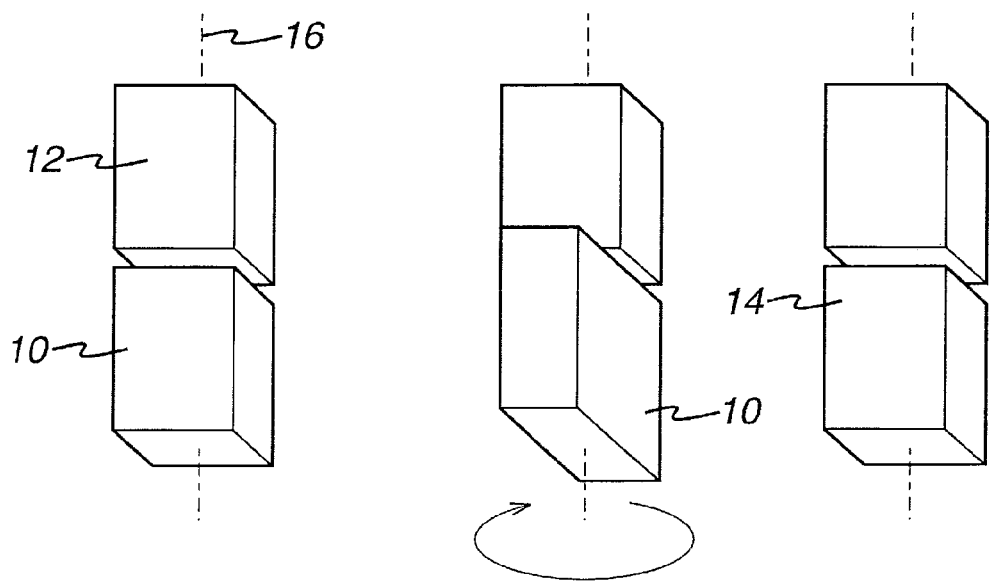
FIG. 2 is a schematic diagram showing a twist action of a device.

FIG. 2 illustrates a twist action whereby the first portion (2) rotates relative to the second adjoining portion (4) of the product to show a different face. The first configuration illustrated is similar to the second or open configuration described above in relation to FIG. 1. A first face (10) of the first portion lies in a plane, and is disposed at an angle of 180°, with respect to a first face (12) or the second portion. The first portion is rotatable relative to the second portion whereby the first face of the second portion moves out of the plane of the first face of the first portion. Rotating 180° results in a second face (14) of the second portion lying in the plane of the first face of the first portion. The axis of rotation (16) lies within the plane of the rotating portion and extends in a line substantially through the centre of the two portions. An example of this action is the rotation of a digital camera LCD when taking a self-portrait.

Figure 3:
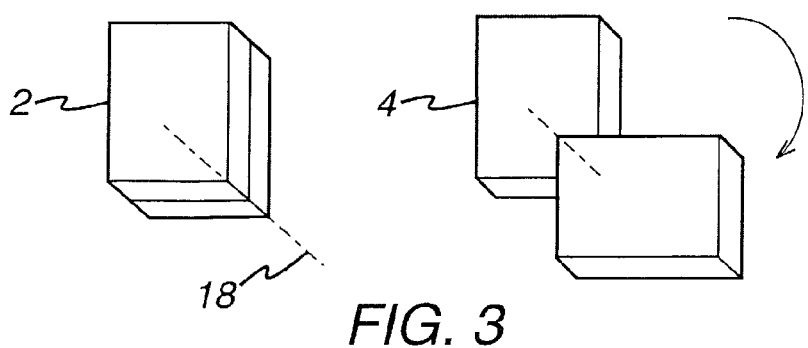
FIG. 3 is a schematic diagram showing a side winding action of a device.

FIG. 3 illustrates a side winding action. Side winding is a rotating action in which a plane of the first part does not change relative to its adjoining part. The part moves within its original plane. The axis of rotation (18) is perpendicular to the plane of the moving part. An example of this action is the rotation of the sails of a windmill.

An embodiment of a hinge element according to the present invention will now be described with reference to FIG. 4.

Figure 4:
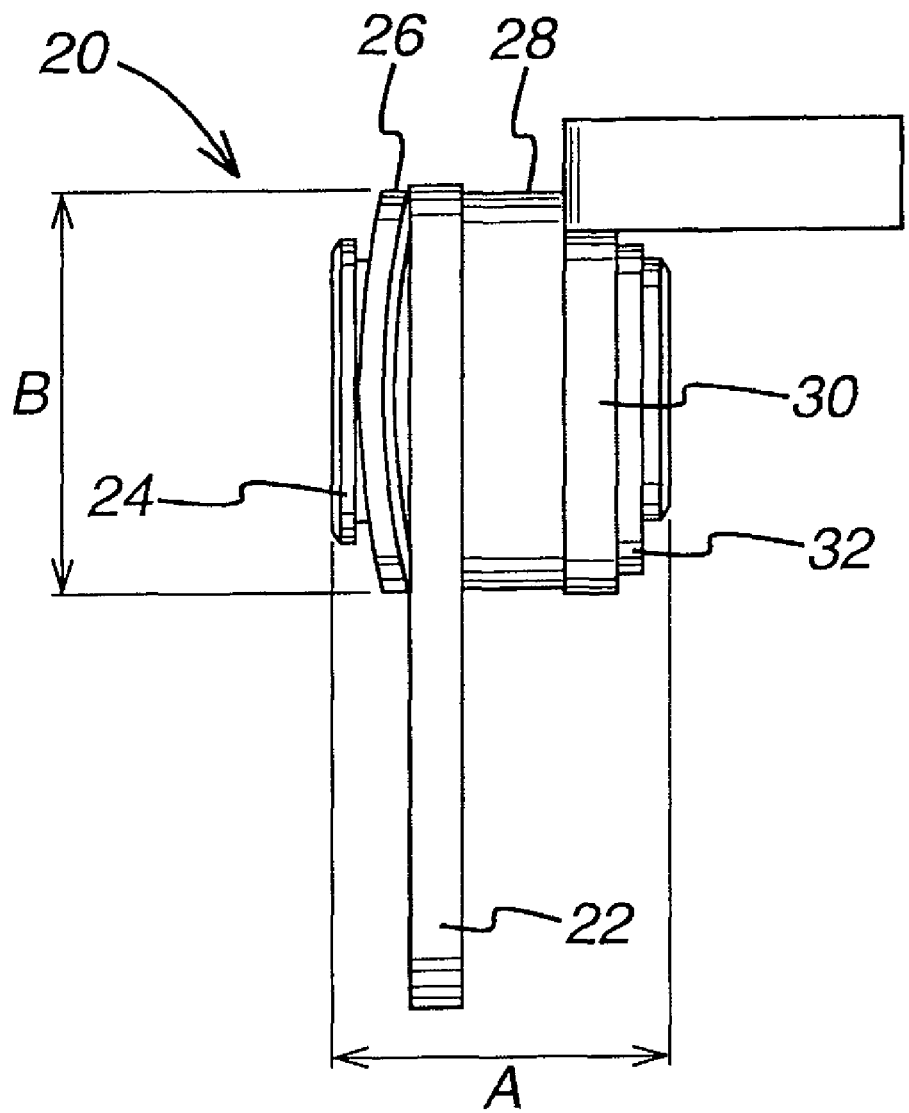
FIG. 4 shows a hinge element according to an embodiment of the present invention.

FIG. 4 illustrates a hinge element 20 for use in a hinge module. The hinge element comprises a first bracket 22 and a boss 24, said bracket 22 being rotatably mounted on said boss 24. The boss is cylindrical and comprises an opening therethrough. The bracket 22 has a circular cut out portion through which the boss extends. The circular cut out portion has an inner surface which slidably cooperates with an outer surface of the boss 24 whereby the bracket 22 is supported on the boss and is rotatable relative to the boss. The hinge element further comprises an elastic member 26, in this case a spring, mounted on the boss. The spring is mounted on the outer surface of the boss. The spring serves to hold the bracket on the boss and also provides an urging force against a side surface of the arm to securely hold the arm against a washer 28 which is also mounted on the outer surface of the boss at an opposite side of the bracket to said spring. A second bracket 30 is mounted on the outer surface of the boss at a side of the washer opposite to the first bracket. The brackets 22, 30 may be arranged for connection to further hinge elements for forming a hinge module. The brackets may also be connected to a body portion of a handheld electronic device for forming a hinge mounted handheld device. A C-clip 32 is mounted on the outer surface of the boss at a side of said bracket opposite to said washer for holding the bracket (and other components which are mounted on the boss) on the outer surface of the boss.

During manufacture, the wiring (which encompasses all types of electrical connection including, for example, cable and FPC (Flexible Printed Circuit)) routing may be provided as part of the hinge module when supplied to the final assembly line. This effectively reduces the complexity of assembly into the parent product. One identified challenge is the logistics involved to supply this assembly with wiring included.

The following features should be facilitated using the vendors' in-house expertise: fixed "click" positions; force profile (opening and closing); and rotation limiters.

The width of the cable hole/opening in the boss will depend on the number and thickness of wires to be used in electrically connecting the two body parts of a device. The width is preferably 2 mm or larger, more preferably 4 mm or larger. In larger/more complex devices the width of the cable hole may be 6 mm or larger and more preferably 8 mm or larger.

The width and diameter of the hinging elements (dimensions A and B) should be minimized, without affecting the width of the cable hole.

It is also desirable to reduce the thickness of the brackets of the hinge modules when the strength of these elements can be maintained by embossing. The materials of the hinge modules are also to be determined by the vendor. Hinge modules will be required to meet the usual reliability and environmental standards, i.e. 100,000 cycles operation (about each axis).

A videophone which can undergo a flip action, a twist action and a side winding action as illustrated in FIGS. 1 to 3, and which comprises a hinge module made up of hinge elements as illustrated in FIG. 4, will now be described with reference to FIGS. 5 to 11.

As shown in FIGS. 5 to 8, the videophone comprises a first body portion 40, a second body portion 42 and a camera module 44. The first body portion comprises a keypad. The second body portion comprises a view screen. The first body portion 40, the second body portion 42 and the camera module 44 are mounted on a hinge module 46 which connects the first and second portions 40, 42 and the camera module 44 allowing relative rotational motion of said parts. FIGS. 5 and 6 show the videophone in a closed configuration in which the first and second body portions 40, 42 are opposed to each other. FIGS. 7 and 8 show the videophone in a first open position in which the second body portion 42 has undergone a 90° flip action and a 90° twist action relative to the first portion 40. The camera module 44 has also undergone a 90° flip action from being aligned with the first body portion 40 to being disposed at 90° relative to the first body portion 40. The view screen 43 and the keypad 45 are visible.

Figure 9:
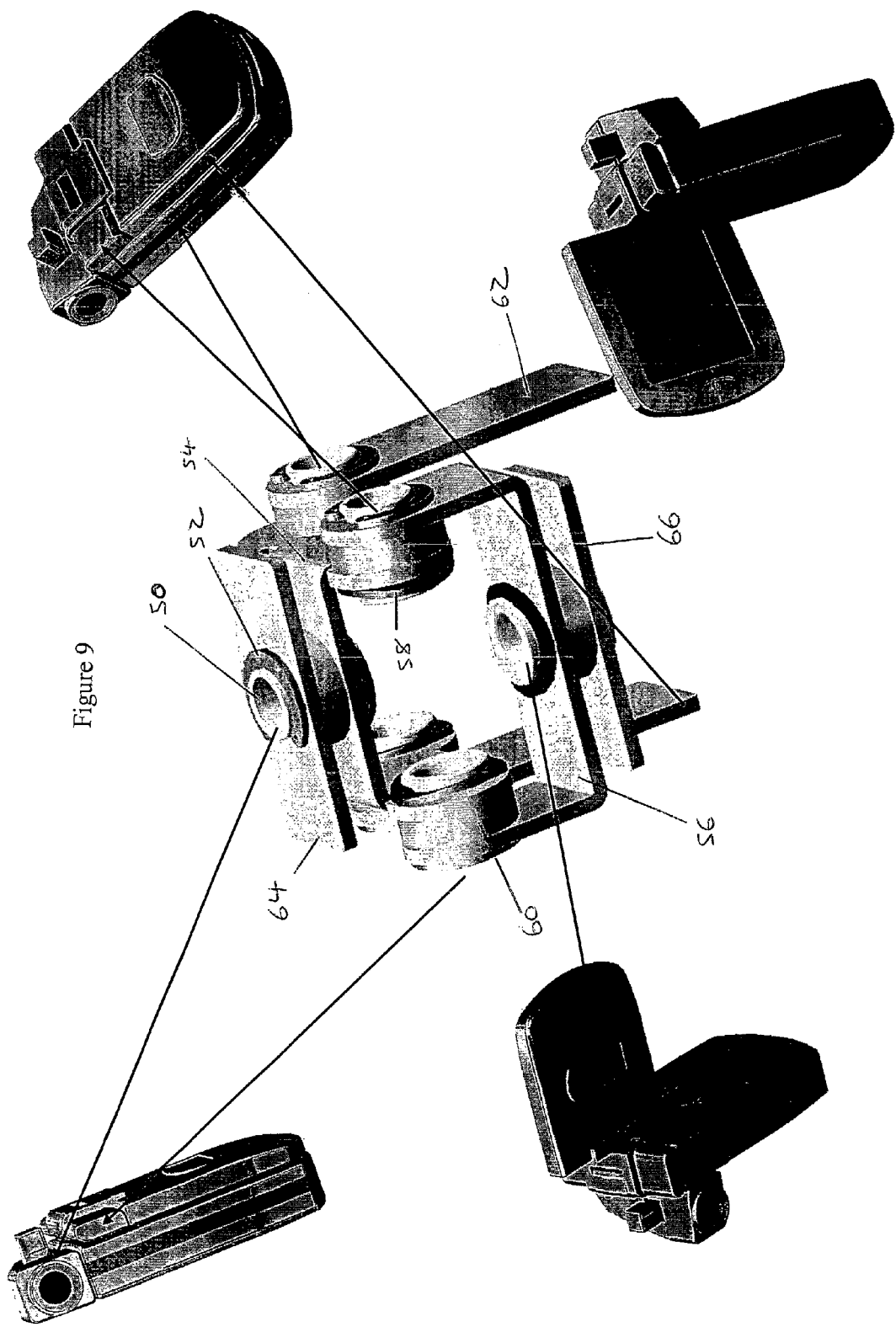
FIG. 9 shows a hinge module according to the present invention comprising hinge elements as shown in FIG. 4.

FIG. 9 shows the hinge module 46 according to an embodiment of the present invention comprising hinge elements as shown in FIG. 4. FIG. 9 also shows the relationship between the elements of the hinge module and the parts of the videophone to which they are connected.

The hinge module comprises six bosses 50, six C-clips 52, one H-shaped bracket 54, one C-shaped bracket 56, six springs 58, six washers 60, two linear brackets 62 with a boss located at an end portion thereof, one linear bracket 64 with a boss located at a middle portion thereof, and 1 L-shaped bracket 66.

The parts are arranged into six hinge elements as previously described and shown in FIG. 4. Five of the hinge elements are mounted on the H-shaped bracket 54. The H-shaped bracket 54 comprises a cross piece and four lobes.

The cross piece has a circular cut-away portion for mounting on an outer surface of a boss 50. Also mounted on this boss is a linear bracket 64 for attachment to the camera module 44. Each of the four lobes of the H-shaped bracket 54 has a circular cut-away portion for mounting the H-shaped bracket on an outer surface of four respective bosses. Two of these bosses have a linear bracket 62 mounted thereon for connecting to the first body portion 40 of the videophone. The other two of these bosses are mounted respectively to two lobes of a C-shaped bracket 56. The C-shaped bracket 56 has a cross piece with a circular cut-away portion mounted on a boss. This boss also has an L-shaped bracket 66 mounted thereon for attaching to the second body portion 42 of the videophone.

The hinge module described above and illustrated in FIG. 9 has 4 axes of rotation. The hinge module has two pairs of hinge elements, each pair sharing an axis of rotation and wherein the two axes of rotation are parallel to each other. This arrangement allows the two body parts to be rotated through up to 360° (depending on whether the camera module is present or not). A third axis is provided by the boss on the cross-piece of the C-shaped bracket and allows the second body portion to be rotated through a 360° twist rotation. A fourth axis is provided by the boss on the cross-piece of the H-shaped bracket and allows the camera module to be rotated through a 360° twist/side winding rotation.

The hinge module should be of a size such that the cable holes should be maintained at at least 4 mm diameter (larger if preferred). In general, the dimensions of the assembly should be kept as small as possible and the weight as light as possible.

The H-shaped bracket of the hinge module has two pairs of hinge elements, each pair sharing an axis of rotation and wherein the two axis of rotation are parallel to each other. This arrangement allows the first and second body parts to be rotated relative to each other in a flip action. The amount of rotation is up to 360° but in practice the camera module prevents rotation through the full 360°. The actual angle of rotation will depend on the size and shape of the camera module but in the present embodiment is at least 180°. In order to prevent damage of the camera module though over rotation a stop may be provided defining a maximum rotation point for the second body portion relative to the first e.g. at 180°.

In one embodiment the camera module is detachable. The phone may undergo an approximately 360° flip when the camera is not attached and undergo an approximately 180° flip when the camera module is attached.

The second body portion is mounted to the H-shaped bracket via a C-shaped bracket such that the second body portion can not only undergo a flip action as previously described, but also rotate about an axis which is perpendicular to the two parallel axis of rotation previously identified so as to provided a twist action. Thus the second body portion can undergo both a flip action and a twist motion.

The camera module is mounted on the H-shape bracket so as to rotatable relative to the first and second body portions. In the closed configuration, with the camera module aligned with the first body portion, the camera module can undergo 360° rotation around an axis which is perpendicular to the previously described flip and twist action axes.

The camera module can also be rotated via the parallel pairs of flip axes such that it moves from a position in line with the first body portion in which it is adjacent an upper side of the first body portion to a position at 90° to the first body portion in which it is adjacent a rear side of the first body portion. The camera module can then under go further rotation in a twist/side winding action relative to the first body portion.

FIGS. 10 and 11 show the position of buttons along a side of the videophone. The illustrated embodiment has a view screen 70 on an outer surface of the second body portion 44 as well as the main view screen on an inner surface of the second body portion 44. Accordingly, information can be displayed while the videophone is in a closed configuration. Soft keys 72 are also provided on the outer surface of the second body portion having user functionality. On a first edge side of the first body portion 40 there is provided a first recording button 74, a zoom button/slide 76, a shutter button 78, a flash button 80, a MACRO button 82 and a mode button/slide 84. On a second edge side of the first body, opposed to the first edge side, there is provided a tripod stand attachment 86 (in the form of a tripod stand fillet), a second recording button 88 and a volume control button 90. More or few buttons, and buttons with different functionality may be provided depending on the specific embodiment. Preferably, the buttons will be positioned to maximize userability.

Figure 12:
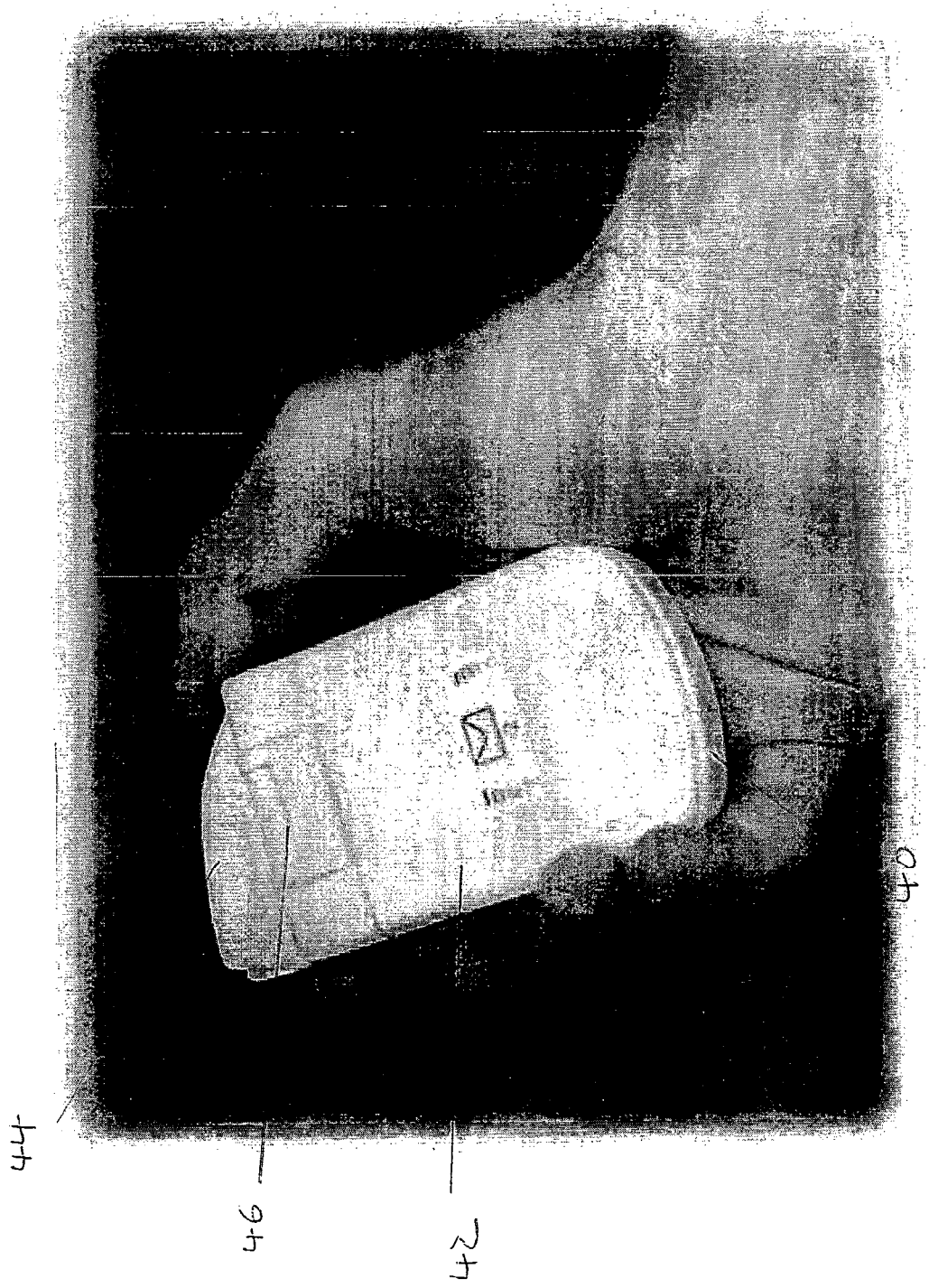
FIG. 12 shows a model of the videophone in a closed configuration in a user's hand.

FIG. 12 shows a model of the videophone in a closed configuration in a user's hand in which the first and second body portions are opposed to each other and the camera module is in line with the first body portion. FIGS. 13 to 17 show the model of FIG. 12 in various flipped open configurations. FIG. 14 shows the user operating keys on the keypad. FIG. 15 shows the model of FIGS. 12 to 14 with the camera module fully rotated. FIG. 16 shows the camera module in line with the phone body. FIG. 17 shows the camera module at an angle in between the fully rotated and in-line configurations of FIGS. 15 and 16 respectively. When the camera module is in line with the first body portion, a lower edge of the second body portion is adjacent and upper surface of the first body portion. When the camera module is fully rotated so as to be adjacent a rear surface of the first body portion, the lower edge of the second body portion is adjacent the side edge portion of the first body portion. That is, as the camera is rotated away from the in line configuration, the second body portion also moves in the same direction. Thus, in FIG. 15 the camera module is fully rotated and a step down is provided between the upper surface of the first body portion and the upper surface of the second body portion. In FIG. 16 the camera module is in line with the first body portion and a step up is provided between the upper surface of the first body portion and the upper surface of the second body portion. In FIG. 17 the camera module is at an intermediate angle and a smooth transition is achieved between the upper surface of the first body portion and the upper surface of the second body portion with no step. Stopping points may be provided to encourage the three parts into the best positions for particular applications.

Figure 18:
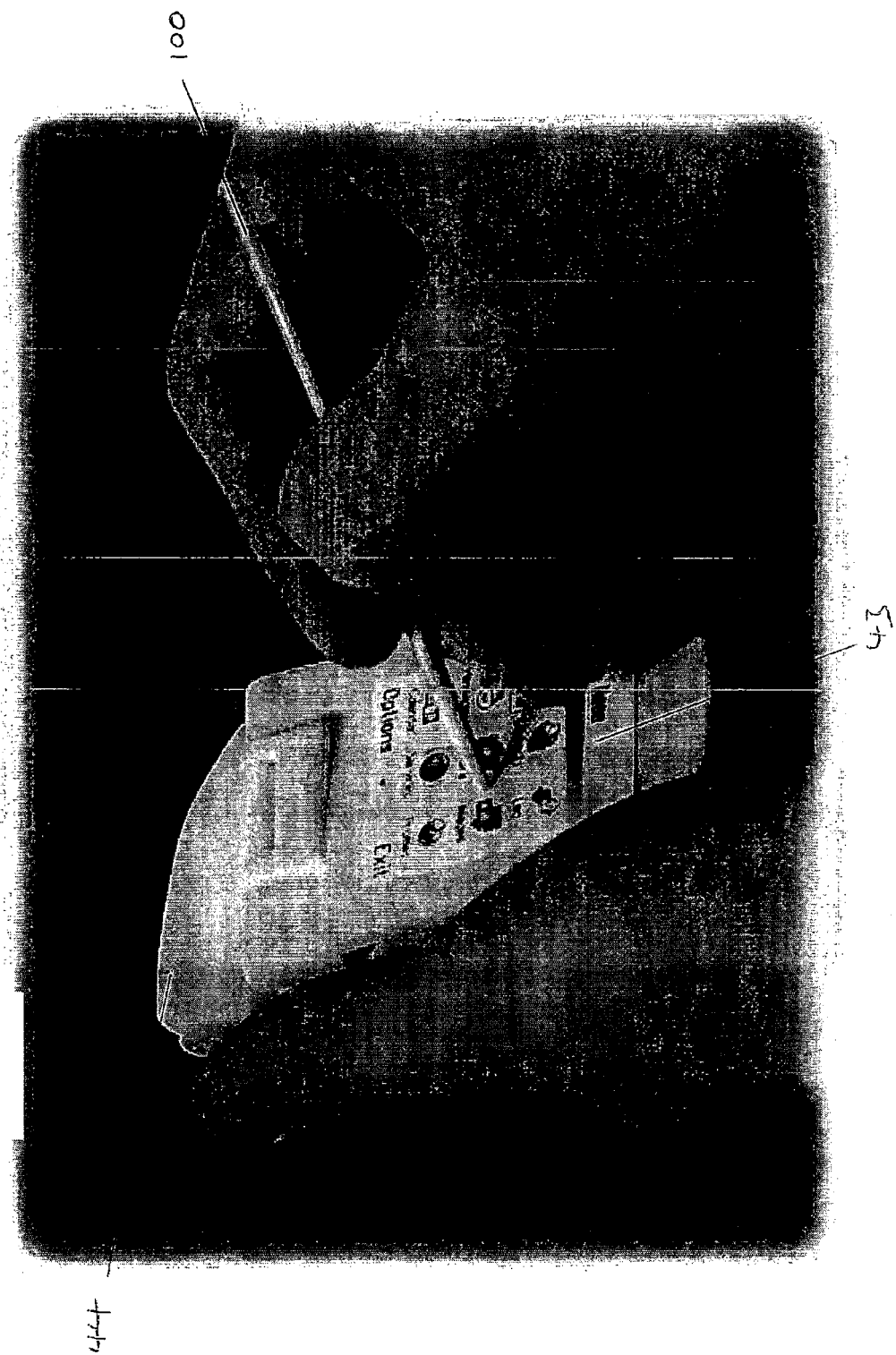
FIG. 18 shows the model of FIGS. 12 to 17 in a tablet mode.

FIG. 18 shows the videophone in a tablet mode. This configuration is achieved by performing a 90° flip, a 180° twist and then a 90° reverse flip whereby the second body portion is opposed to the first body portion but with the surface comprising the main view screen exposed to the exterior. In the embodiment illustrated in FIG. 18 a light pen 100 is used to operate the videophone as an electronic note pad.

Figure 20:
FIG. 20 shows the model of FIGS. 12 to 19 in the compact camera mode for a landscape picture.
Figure 19:
FIG. 19 shows the model of FIGS. 12 to 18 in compact camera mode.

FIGS. 19 and 20 show the videophone in the tablet configuration of FIG. 18 but with the camera module rotated 90° for use in a compact camera mode e.g., portrait in FIG. 19 and landscape in FIG. 20.

Figure 22:
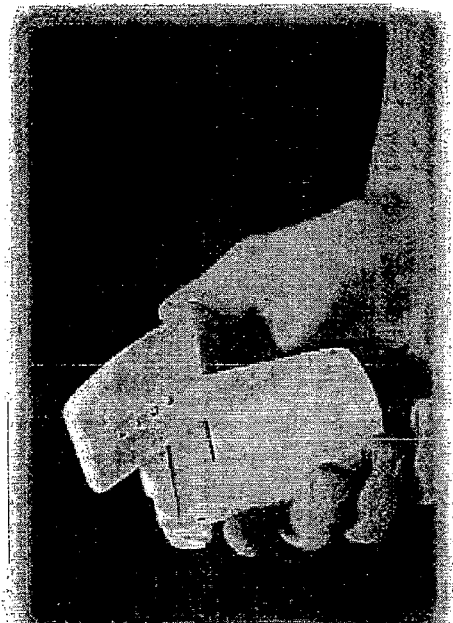
FIG. 22 shows the camcorder arrangement of FIG. 21 from a different direction.
Figure 21:
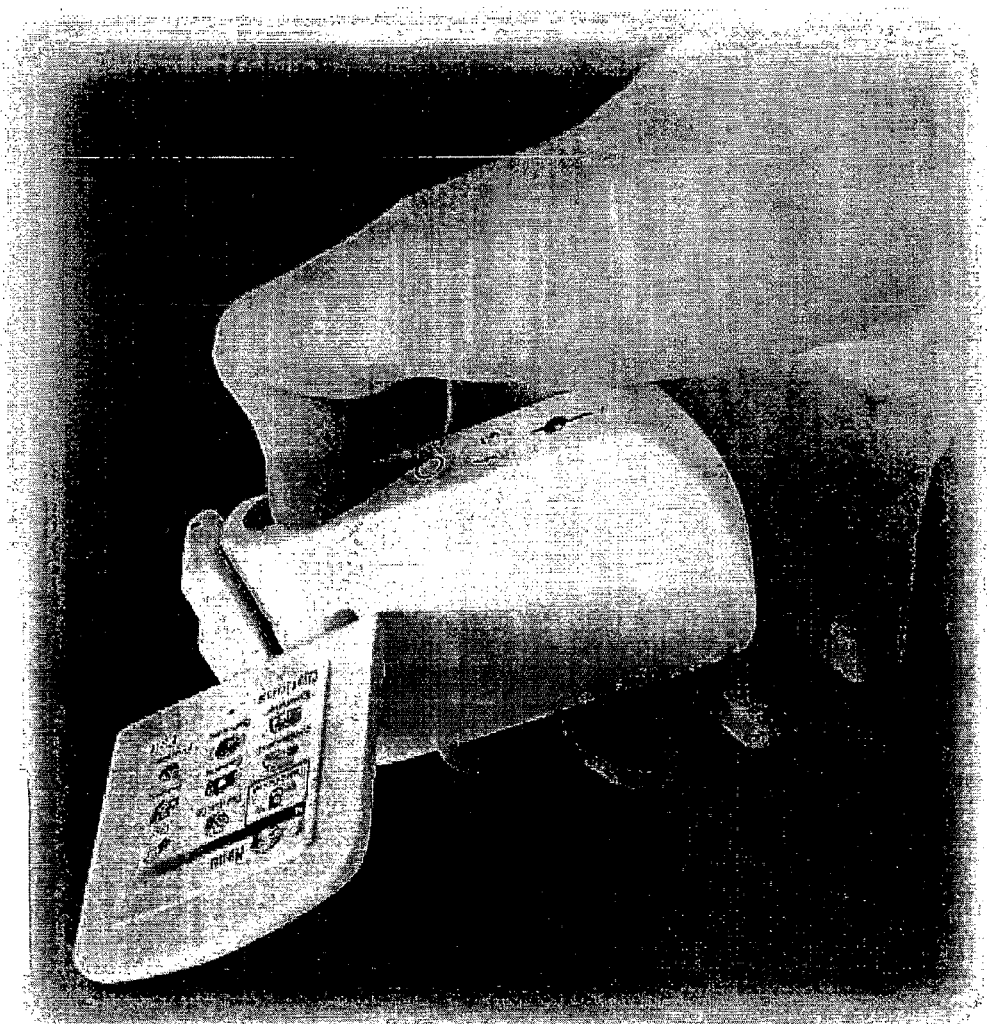
FIG. 21 shows the model of FIGS. 12 to 19 in camcorder arrangements.

FIGS. 21 and 22 show the videophone in a camcorder arrangement similar to that illustrated in FIGS. 7 and 8.

Figure 24:
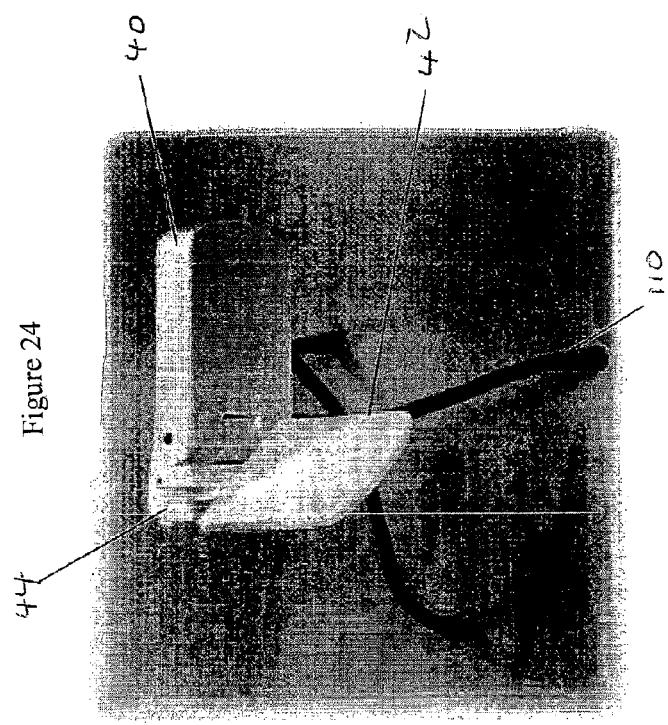
FIG. 24 shows a different view of the model of FIG. 23 mounted on the tripod.
Figure 23:
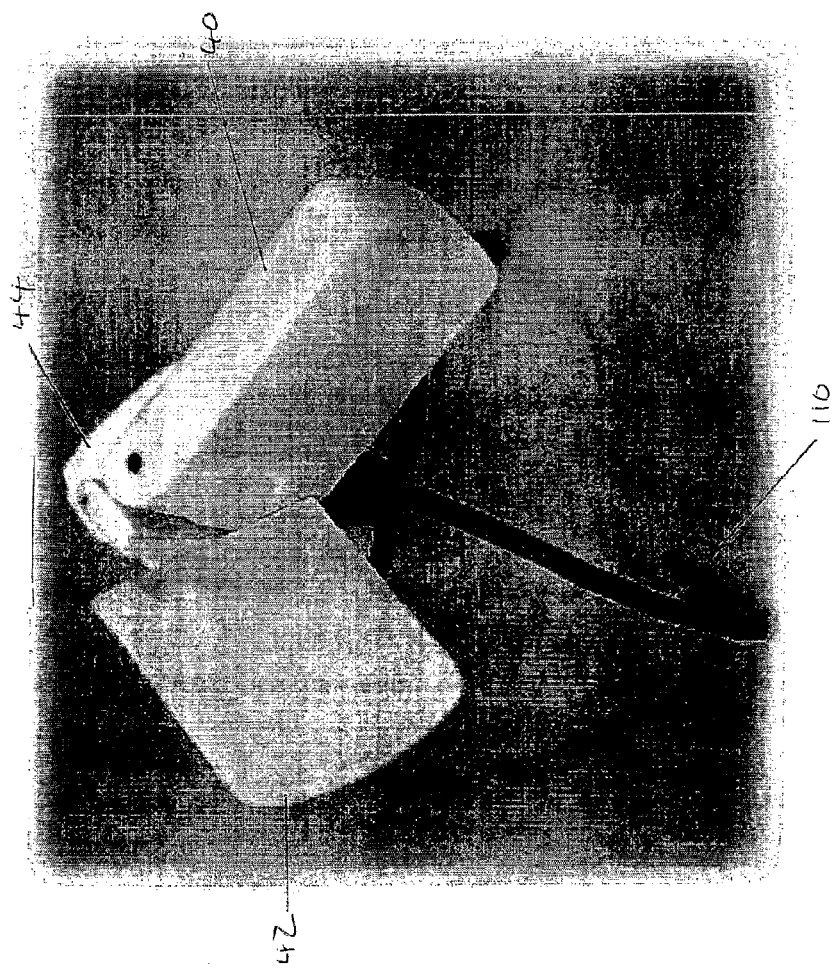
FIG. 23 shows the model of FIGS. 12 to 22 mounted on a tripod.

FIGS. 23 and 24 show the videophone mounted on a stand 110 (e.g. a tripod) for desktop applications. For example, this may be of use for video conferences or for taking photographs. A timer may be provided for the photographic function so that a user can mount the videophone and move into the frame prior to the picture being taken.

Figure 26:
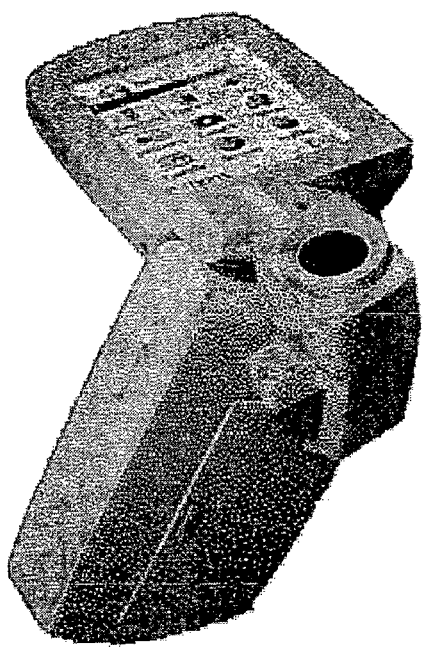
FIG. 26 shows the model of FIGS. 12 to 25 in a different desk-stand-videoconference arrangement to that illustrated in FIG. 25.
Figure 25:
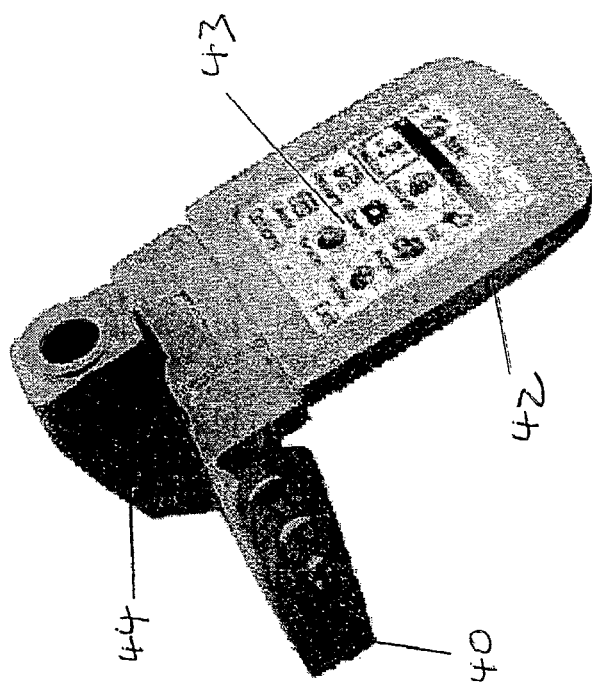
FIG. 25 shows the model of FIGS. 12 to 24 in a desk-stand-videoconference mode.

FIGS. 25 and 26 show the videophone in a desk-stand-video conference mode without the use of a separate stand. In the portrait mode of FIG. 25, the vertical angle of the camera relative to the screen is limited. A flat base for the end portions of the first and second body portions is advantageous. In the landscape mode of FIG. 26, the vertical angle of the camera relative to the screen is full variable. Advantageously, buttons on a lower edge of the first body portion do not protrude as they may be accidentally actuated. Alternatively, the buttons on the lower edge may be disabled.

Figure 28:
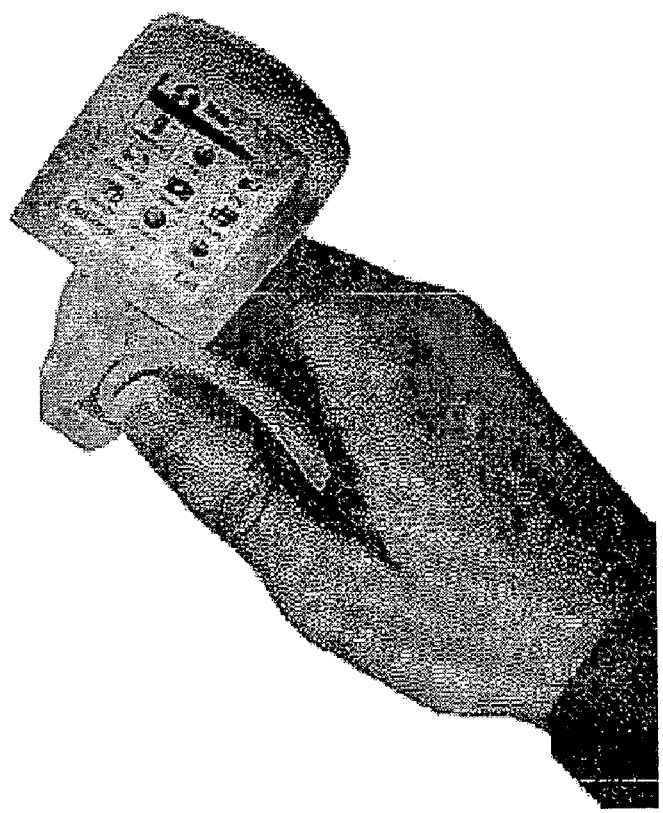
FIG. 28 shows the model of FIGS. 12 to 27 in camcorder mode with the screen on the right hand side of the main body.
Figure 27:
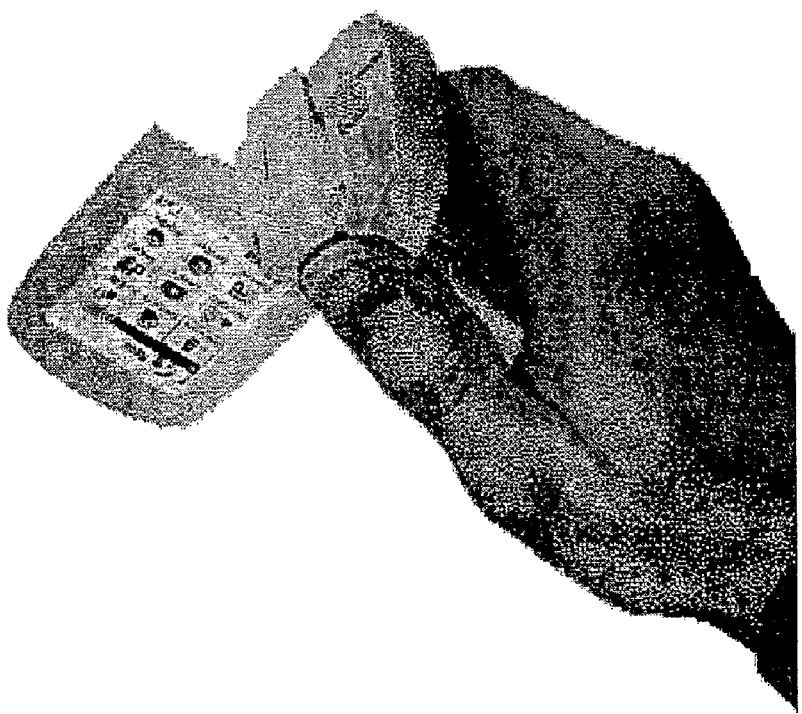
FIG. 27 shows the model of FIGS. 12 to 26 in camcorder mode with a screen positioned on the left hand side of a main body.

FIGS. 27 and 28 illustrate that in camcorder mode, the view screen may be positioned on the left hand side or the right hand side of the first body portion. Also, either hand may be used to operate the device.

Figure 31:
FIG. 31 shows the camcorder arrangement when the model is held in line of sight far apart from a user's body.
Figure 32:
FIG. 32 shows the model held in line of sight close to a user's body.
Figure 30:
FIG. 30 shows the model in a camcorder arrangement with the view screen directed upwards for ease of use when the phone is held low down relative to the user.
Figure 29:
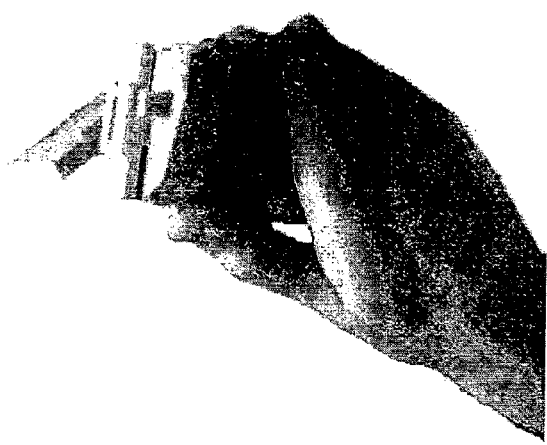
FIG. 29 shows the model in camcorder mode with the view screen angled downwards for ease of use when the phone is held up high above the user's head.

FIGS. 29 to 32 show various camcorder mode arrangements. FIG. 29 shows the videophone with the view screen angled downwards for ease of use when the phone is held up high above the user's head. FIG. 30 shows the videophone with the view screen directed upwards for ease of use when the phone is held low down relative to the user. FIG. 31 shows a camcorder arrangement for when the videophone is held in line of sight far apart from a user's body. FIG. 32 shows a camcorder arrangement for when the videophone is held in line of sight close to a user's body.

Figure 33:
FIG. 33 shows the model with the camera module at an angle relative to the front body.

FIG. 33 shows the videophone with the camera module at an angle relative to the first body portion. This arrangement is useful for showing surroundings in a video call and can be used to take pictures discretely without being noticed.

Figure 34:
FIG. 34 shows the model in a configuration suitable for shading the view screen from bright light sources.

FIG. 34 shows the videophone in a configuration suitable for shading the view screen from bright light sources. In this arrangement the view screen is also hidden for privacy.

FIG. 35 shows the videophone attached by a necklace/lanyard 120 around a user's neck. This provides a fashionable way of carrying the phone around. The phone is also secure and always at hand.

FIG. 36 shows the videophone arranged to be attached to a pocket of a user's clothing such as a top pocket, trousers/belt or a collar. This application is ideal for social and business situations and for hands free use e.g. to video the surroundings.

FIG. 37 shows the video attached by a wrist/armband 130 to a user's wrist. Attachment points for the wrist/armband are provides on the first and/or second body portions. This application is ideal for sports, driving, riding, hand gliding etc.

An embodiment of the present invention comprises a video/camera phone with a high degree of transformability. The video/camera phone has a hinge arrangement that enables easy transformation between a large number of configurations for the following use modes:

Fold-type mobile phone for voice calls;
two modes of landscape video conference;
two modes of portrait video conference;
pistal grip camcorder mode;
variable angle grip camcorder;
tablet mode for video editing (with touch screen and stylus);
two modes of desktop standing for video conferencing (both portrait and landscape);
variable angle camera unit;
variable angle view screen for maintaining the landscape-to-landscape relationship between display and camera.

The many different ergonomic demands to be placed on a videocamera phone means that the most versatile and intuitive ergonomic products are likely to be the strongest and longest standing product family's on the market.

Embodiments of the present invention may be applied to a mobile phone. Alternatively, embodiments of the present invention may be applied to other small handheld electronic devices such as calculators, mobile gaming devices, handheld video records, electric notepads, electronic books, PDAs, personal stereos, dictaphones, etc.

While this invention has been particularly shown and described with reference to preferred embodiments thereof, it will be understood by those skilled in the art that various changes in form and details may be made therein without departing from the scope of the invention as defined by the appended claims.

The invention claimed is:

1. A handheld electronic device hinge for mechanically connecting first and second rotatable body members of a handheld electronic device, said hinge comprising a first bracket and a second bracket, wherein said first bracket comprises:
a first connecting member for connecting to the first rotatable body member of the handheld electronic device for rotation around a first axis; and
a second connecting member connected to the second bracket for rotation of said second bracket around a second axis, said first and second axes being spaced apart and parallel to each other,
wherein said second bracket comprises a third connecting member for connecting to the second rotatable body member of the handheld electronic device for rotation around a third axis, said third axis being perpendicular to said first and second axes,
wherein said first bracket further comprises a fourth connecting member for connecting to a third rotatable body member of the handheld electronic device, the fourth connecting member enabling the third rotatable body member to rotate about a fourth rotational axis perpendicular to the first and second axes, wherein the first bracket further allows the third rotatable body member to rotate about the first axis independently of the first rotatable body member, and
wherein said first, second, and third rotatable body members are configured to rotate around said first, third and fourth axes, respectively, independently of one another.

2. A handheld electronic device hinge according to claim 1, wherein said fourth connecting member is a detachable connecting member for detachably connecting to the third body member of the handheld electronic device.

3. A handheld electronic device hinge according to claim 1, wherein the connecting members comprise at least one boss, the brackets being mounted on the at least one boss.

4. A handheld electronic device hinge according to claim 3, wherein the first connecting member comprises two bosses located along the first axis.

5. A handheld electronic device hinge according to claim 3, wherein the second connecting member comprises two bosses located along the second axis.

6. A handheld electronic device hinge according to claim 3, wherein the third connecting member comprises a single boss located on the third axis.

7. A handheld electronic device hinge according to claim 3, wherein the fourth connecting member comprises a single boss located on the fourth rotational axis.

8. A handheld electronic device hinge according to claim 3, wherein the brackets have circular holes through which each boss extends, the circular holes having an inner surface which slidably cooperates with an outer surface of the bosses whereby the brackets are supported on the bosses and are rotatable relative to the bosses.

9. A handheld electronic device hinge according to claim 3, wherein each boss has a through hole for receiving wiring for electrically connecting the parts of the handheld electronic device.

10. A handheld electronic device hinge according to claim 9, wherein said through hole is 4 mm or larger.

11. A handheld electronic device hinge according to claim 3, wherein each boss has an elastic member mounted thereon for providing an urging force against a side surface of the first or second bracket to securely hold the bracket on the boss.

12. A handheld electronic device hinge according to claim 11, wherein the elastic member is a spring.

13. A handheld electronic device hinge according to claim 1, wherein the first bracket is a H-shaped bracket comprising a cross-piece and four lobes, said lobes being perpendicular to said cross-piece, each lobe having a circular hole for mounting the first bracket on an outer surface of a boss, wherein the first bracket connects four bosses together.

14. A handheld electronic device hinge according to claim 13, wherein the cross-piece of the H-shaped bracket has a circular hole for mounting a boss, said boss comprising the fourth connecting member.

15. A handheld electronic device hinge according to claim 1, wherein the second bracket is a C-shaped bracket comprising a cross-piece and two lobes, said lobes being perpendicular to said cross-piece, each lobe having a circular hole for mounting the second bracket on an outer surface of a boss, and the cross-piece having a circular hole for mounting a boss, whereby two bosses mounted in the two lobes comprise the second connecting member and a boss mounted in the cross-piece comprises the third connecting member.

16. A handheld electronic device hinge according to claim 1, wherein the first rotatable body member, the second rotatable body member, the third rotatable body member, and the handheld electronic device hinge are included as part of the handheld electronic device.

17. A handheld electronic device hinge according to claim 16, wherein the first rotatable body member comprises a keypad or a view screen.

18. A handheld electronic device hinge according to claim 16, wherein the second rotatable body member comprises a keypad or a view screen.

19. A handheld electronic device hinge according to claim 16, wherein said third body member is a camera.

20. A handheld electronic device hinge according to claim 16, wherein said third body member is detachably connected to said hinge.

21. A handheld electronic device hinge according to claim 16, wherein said handheld electronic device further comprises a connecting element for connecting to a stand.

22. A handheld electronic device hinge according to claim 16, wherein said handheld electronic device further comprises a connecting element for connecting to an armband.

23. A handheld electronic device hinge according to claim 16, wherein said handheld electronic device further comprises a connecting element for connecting to a necklace.

24. A handheld electronic device hinge according to claim 16, wherein the electronic device is at least one of a mobile gaming device, a mobile phone, a hand-held video recorder, an electronic note pad, an electronic book, a PDA, a calculator, a personal stereo and a dictaphone.

* * * * *